United States Patent [19]

Tsuda et al.

[11] Patent Number: 4,649,391

[45] Date of Patent: Mar. 10, 1987

[54] MONOPULSE CAVITY-BACKED MULTIPOLE ANTENNA SYSTEM

[75] Inventors: George I. Tsuda, Fullerton; Charles R. Edelsohn, Los Angeles, both of Calif.

[73] Assignee: Hughes Aircraft Company, Los Angeles, Calif.

[21] Appl. No.: 576,078

[22] Filed: Feb. 1, 1984

[51] Int. Cl.[4] .......................... G01S 13/44; H01Q 21/26; H01Q 25/02

[52] U.S. Cl. .......................... 342/153; 343/789; 343/797; 343/816

[58] Field of Search .......................... 343/16 M, 363, 364, 343/365, 366, 427, 447, 895, 784, 797, 816, 795, 343/799

[56] References Cited

U.S. PATENT DOCUMENTS

| | | | |
|---|---|---|---|
| 3,344,425 | 9/1967 | Webb | 343/16 M |
| 3,358,288 | 12/1967 | Du Bost et al. | 343/789 |
| 3,821,740 | 6/1974 | Erlich | 343/7 A X |
| 4,042,935 | 8/1977 | Ajioka | 343/795 |
| 4,081,803 | 3/1978 | Dempsey | 343/816 X |
| 4,543,579 | 9/1985 | Teshirogi | 343/365 |

OTHER PUBLICATIONS

*Antenna Engineering Handbook*, 2ed., 1984, chapter 4, 7 and 14. R. C. Johnson and H. Jasik.

*Reference Data for Radio Engineers*, ITT, 1975, pp. 27-1 through 27-9 and pp. 27-17 through 27-19.

*Primary Examiner*—T. H. Tubbesing

*Assistant Examiner*—Gilberto Barrón, Jr.

*Attorney, Agent, or Firm*—T. A. Runk; A. W. Karambelas

[57] ABSTRACT

A cylindrical cavity-backed multipole antenna system for high frequency applications is disclosed. The antenna system comprises a plurality N of planar radiation elements disposed on a dielectric disc mounted on the top surface of a conductive cylindrical cavity and equally spaced about its axis. A network circuit is adapted to introduce, for the system sum signal, progressive phase shifts of 360°/N to signals associated with adjacent elements and, for the difference signal, progressive phase shifts of 720°/N. The antenna system may be used to both transmit and receive electromagnetic radiation. The antenna sum and difference patterns are substantially symmetric in space about the antenna boresight.

28 Claims, 15 Drawing Figures

MONOPULSE CAVITY-BACKED MULTIPOLE ANTENNA SYSTEM

BACKGROUND OF THE INVENTION

1. Field of the Invention

This invention relates to high frequency antenna systems, and more particularly to cavity-backed antenna systems.

2. Description of the Prior Art

For many applications of high frequency antenna systems, for example, angle-of-arrival monopulse detection, it is advantageous to use a circularly polarized antenna system having a relatively high gain and whose gain pattern is characterized by symmetry. It would also be advantageous to provide an antenna system sensitive to both senses of circularly polarized radiation, that is, right circular polarization (RCP) and left circular polarization (LCP).

One type of antenna system which has been considered for angle-of-arrival detection applications is the spiral antenna, and in particular quad spiral antennas comprising four spiral conductive elements. While the polarization of this type of antenna system is circular, it suffers several disadvantages, including its relatively low gain as a result of resistive absorbers coupled to the outer ends of its spiral elements and/or placed at the bottom of the cavity and its sensitivity to only one sense of circular polarization.

Antenna feed systems are also known wherein concentric, nested, circular cavity-backed wing dipole structures are employed which have a relatively high efficiency combined with broad (multiple octave) bandwidth. Yet these systems are unsuited to use in angle-of-arrival detection systems because of their limited direction finding capability and nonsymmetric gain pattern.

Typical monopulse systems employing X-Y (horizontal and azimuth) coordinates to define the target have detected the antenna sum signal, and two antenna difference signals (azimuth and horizontal), for a single polarization sense. It has, therefore, been customary to employ three receiver channels, one for each of the sum and difference signals. It would be desirable to minimize the number of required receivers for either one or both polarization senses.

It is, therefore, an object of the present invention to provide an antenna system having dual circulary polarized monopulse capabilities over a very wide (multi-octave) bandwidth.

It is another object of the present invention to provide a high frequency antenna system having an accurate direction finding capability which is independent of polarization of incident radiation with little sacrifice in efficiency or bandwidth.

It is yet another object of the present invention to provide a high frequency antenna system whose sum and difference patterns are substantially symmetrical in space about its boresight.

Another object of the invention is to provide an antenna system of circular polarization which has a relatively high gain.

It is yet another object of the present invention to provide an antenna system of dual circular polarization, adapted to provide sum and difference signals for either sense of polarization and requiring only two receiver channels for each polarization sense.

It is a further object to provide an antenna system adapted to concentrically nested configurations operable in multiple frequency bands, which obtains the advantages of known concentrically nested structures with their high efficiency and broad bandwidth, while at the same time providing the desired symmetry and uniform sensitivity to polarized electromagnetic radiation.

SUMMARY OF THE INVENTION

In keeping with the principles of the present invention, eight planar radiation elements are symmetrically spaced on a dielectric disc mounted in the top plane of a conductive circular cavity. In the preferred embodiment, the radiation elements are identical polygon shaped conductive elements disposed on and closely spaced at uniform intervals around the dielectric disc. A network circuit is provided which has eight signal ports joined to the radiation elements by feed connections. The network circuit also includes four network ports, namely a sum RCP, a sum LCP, a difference RCP and a difference LCP ports.

The antenna assembly may be used to both transmit and receive electromagnetic radiation. In the transmit mode, a signal is supplied to one or more of the network ports of the network circuit, and divided to be fed to the radiation elements. The network circuit is adapted to introduce, for the antenna system sum pattern, progressive 45° phase shifts in the signals fed to adjacent elements. For the antenna system difference signal, the network circuit is adapted to introduce progressive 90° phase shifts in the signals fed to adjacent elements. The antenna system is arranged to force circularly symmetric propagation modes, and to illuminate the cavity with either sense of circularly polarized radiation.

When operated in the receive mode, the antenna system receives electromagnetic radiation from a remote source, which results in the excitation of the radiation elements. The resulting eight signals from the radiation elements are fed to the signal ports of the network circuit and appropriately combined and phase shifted to produce both sum and difference signals for both senses of polarization. To generate the respective sum and difference signals, contributions from successive elements are progressively phase shifted 45° and 90° in a similar manner to that described for the transmit mode.

The antenna sum and difference patterns achieved as a result of the invention are substantially symmetrical for all angles about the effective antenna boresight. With this symmetry, the antenna system is very useful for angle-to-arrival monopulse detection systems. The effective phase center of the antenna system is substantially invariant as a function of frequency.

The invention provides dual channel monopulse operation and has substantially higher efficiency than the available spiral antennas. To achieve multi-band capability, annular circular cavities, each with corresponding sets of radiating elements and network circuits, may be concentrically nested.

The use of eight elements is exemplary only. The general case is N elements, with the respective phase shifts for the sum and difference signals comprising 360°/N and 720°/N, respectively.

Other features and improvements are disclosed.

BRIEF DESCRIPTION OF THE DRAWINGS

The above-mentioned and other features and objects of the present invention will become more apparent by reference to the following description taken in conjunction with the following drawings, where like reference numerals denote like elements and in which.

DETAILED DESCRIPTION OF THE PREFERRED EMBODIMENT

The present invention comprises a novel high frequency antenna system. As will be apparent to those skilled in the art, the antenna system may be employed to receive and/or transmit electromagnetic radiation. The antenna system could also be used as a feed system for a reflector or lens.

Figure 1B:
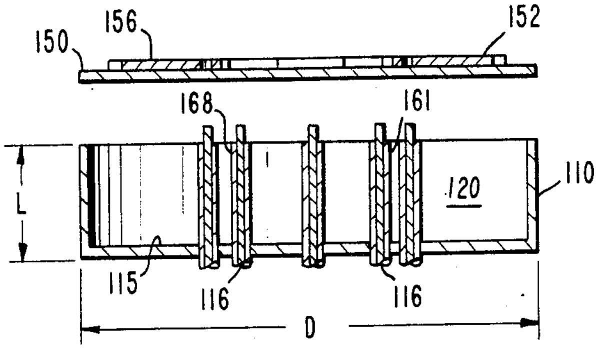
FIG. 1*b* is a cross-sectional view of the embodiment of FIG. 1.
Figure 1A:
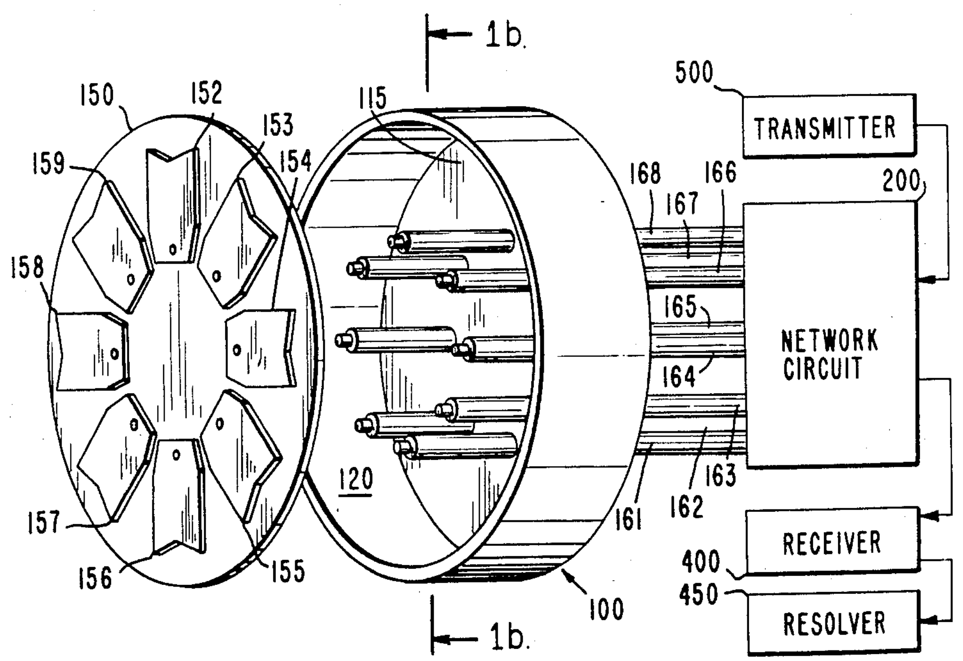
FIG. 1*a* is a partially exploded perspective view of a preferred embodiment of the present invention.

Referring now to FIGS. 1*a* and 1*b*, a preferred embodiment of the antenna system of the present invention is disclosed. The antenna structure includes cylindrical enclosure 100 formed from cylinder 110 with plate 115 enclosing one end thereof. Cylinder 110 and plate 115 are fabricated from a conductive material and define cavity 120 with a top rim 112.

Plate or disc 150 is shown, in exploded view, removed from the top rim 112 of cavity 120. Plate 150 is formed of a thin, low-loss, dielectric material and in use is secured by conventional means to the top rim 112. Eight radiation elements 152–159 are disposed on plate 150, e.g., by printing, gluing or bonding, and are fabricated from a thin conductive material, such as copper, silver or gold. In the preferred embodiment, elements 152–159 each define a polygon shape (best illustration in FIG. 2) and are spaced symmetrically about the center of the disc 150.

As a feed system for the radiation elements, eight coaxial transmission lines 161–168 are brought through openings 116 in plate 115. These transmission lines (for example, coaxial cables) are of substantially the same electrical length and comprise an inner conductor separated by a dielectric from an outer conductor. The outer conductors of each line are conductively connected to plate 115 and to each other, and one end of each of the center conductors is attached to an element 152–159. The other ends of the center conductors are coupled respectively to the eight signal ports of network circuit 200.

Circuit 200 includes sum and difference network ports for each sense of polarization, which are coupled to four-channel receiver 400, whose output in turn is coupled to radar resolver 450. Receiver 400 and resolver 450 are conventional in design and will not be described in further detail. At least the sum ports of circuit 200 may also be coupled to transmitter 500 for transmit operation, for example, through appropriate transmit/receive switches.

Referring now to FIG. 1*b*, a cross-sectional view of the embodiment shown in FIG. 1*a*, taken along line 1*b*—1*b*, is shown. The diameter D of cylindrical cavity 120 as represented in FIG. 1*b* is approximately 75% of the wavelength at the lower band-edge frequency of the designed frequency band of the antenna system. The depth L of the cavity is approximately one-quarter of the wavelength at the mid-band frequency. These dimensions may be optimized in designing for particular applications.

Figure 2:
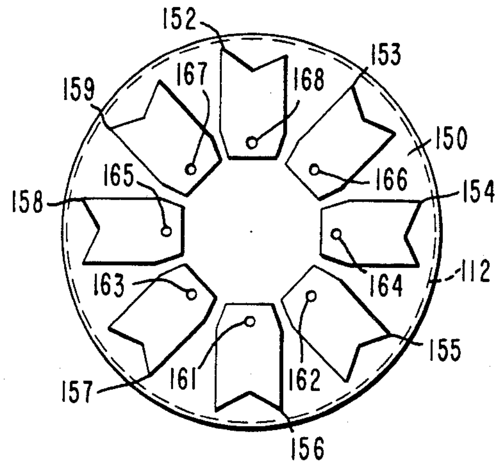
FIG. 2 is a simplified plan view of the embodiment of FIG. 1.

Referring now to FIG. 2, a plan view of disc member 150 is shown. Elements 152–159 preferably comprise identical closely-packed elements of a polygon or modified sector shape. The elements are spaced symmetrically around the center axis of the disc 150. The center conductors of lines 161–168 extend through appropriately positioned holes formed in disc 150 and elements 152–159, and are electrically connected to the elements by conventional methods, e.g. soldering.

Figure 3A:
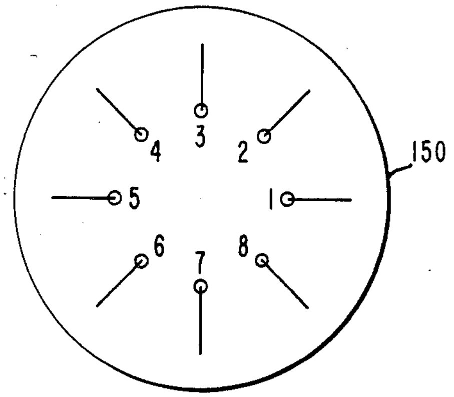
FIG. 3*a* is a simplified schematic illustration of the antenna element structure shown in FIG. 1*b*.
Figure 3B:
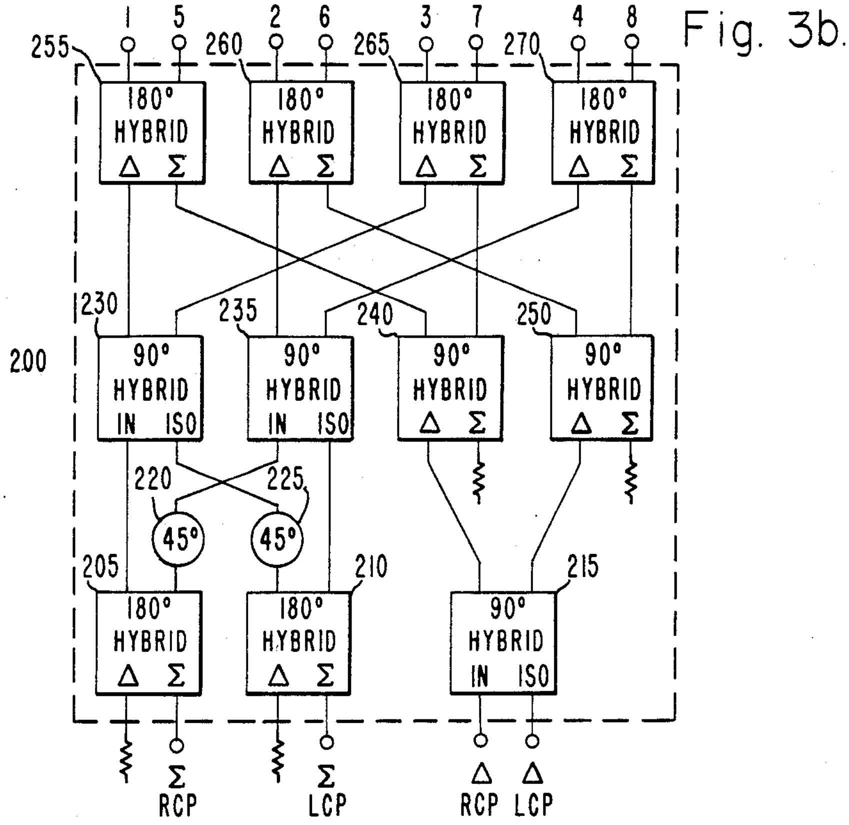
FIG. 3*b* is a schematic illustration of the network circuit of the preferred embodiment.

FIGS. 3*a* and 3*b* illustrate the network circuit 200 which, together with feed lines 161–169, couples the element 152–159 to the transmitter and/or receiver sections. FIG. 3*a* is a simplified schematic illustrating eight radiation elements numbered respectively 1 through 8 (corresponding to the radiation elements 154–159, 152, 153). Terminals 1–8 shown in FIG. 3*b* represent the signal ports of circuit 200 which are coupled via transmission lines 161–169 to the correspondingly numbered radiation elements.

The network circuit 200 utilizes common 90° and 180° hybrid devices. These hybrid devices comprise four port devices, the 180° hybrid having sum and difference ports, and two side arm ports. When the sum port of the 180° hybrid is driven, the two essentially identical outputs at the side arm ports will be in phase with the input signal, with the input signal power divided between the two side arm outputs. When the difference port is driven, the two equal power side arm outputs will be 180° out of phase.

The 90° hybrid similarly has two side arm ports, an input ("In") port, and an isolation ("Iso") port. When the isolation port is driven, the two equal power side arm outputs will be in phase. When the input port is driven, the two equal power side arm outputs will be 90° out of phase.

Network circuit 200 also has four network ports, one each for the sum RCP signal, the sum LCP signal, the difference RCP signal, and the difference LCP signal. These four network ports are in turn coupled to the four channel receiver 400 and/or to the transmitter 500.

The sum RCP port of circuit 200 is provided by the sum port of 180° hybrid 205. The difference port of hybrid 205 is terminated in a matched load. The sum LCP port of circuit 200 is provided by the sum port of 180° hybrid 210. The difference port of hybrid 210 is terminated in a matched load. The difference RCP and difference LCP ports of circuit 200 are respectively provided by the "In" and "Iso" ports of 90° hybrid 215.

One side arm port of hybrid 205 is coupled to the "In" port of 90° hybrid 230; the other side arm port of hybrid 205 is coupled through 45° phase shift device 220 to the "In" port of 90° hybrid 235. One side arm port of hybrid 210 is coupled through 45° phase shift device 225 to the "Iso" port of 90° hybrid 230. The other side arm port of hybrid 210 is coupled to the "Iso" port of 90° hybrid 235.

In the preferred embodiment, 45° phase shift devices 220 and 225 comprise coaxial transmission lines having a length equal to one-eighth the wavelength at the mid-band frequency of the feed system. Other devices for phase shifting an rf signal are well known and could be used as well.

One side arm port of 90° hybrid 215 is coupled to the difference port of 180° hybrid 240. The sum port of hybrid 240 is terminated in a matched load. The other side arm port of hybrid 215 is coupled to the difference port of 180° hybrid 250 which has the sum port thereof terminated in a matched load.

One side arm port of hybrid 230 is coupled to the difference port of 180° hybrid 255. The side arm port of hybrid 230 is coupled to the difference port of 180° hybrid 265.

One side arm port of 90° hybrid 235 is coupled to the difference port of 180° hybrid 260. The other side arm port of hybrid 235 is coupled to the difference port of 180° hybrid 270.

One side arm port of 180° hybrid 240 is coupled to the sum port of hybrid 255. The other side arm port of hybrid 240 is coupled to the sum port of hybrid 265.

One side arm port of hybrid 250 is coupled to the sum port of hybrid 260. The other side arm port is coupled to the sum port of hybrid 270. The difference port of hybrid 250 is terminated in a matched load.

Network circuit 200 provides resultant relative phase shifts for the respective sum and difference signals for each signal port 1–8 as shown in Table I.

TABLE I

| Port | Sum RCP | Sum LCP | Difference RCP | Difference LCP |
|---|---|---|---|---|
| 1 | 0 | 135 | 0 | 90 |
| 2 | 45 | 90 | 90 | 0 |
| 3 | 90 | 45 | 180 | 270 |
| 4 | 135 | 0 | 270 | 180 |
| 5 | 180 | 315 | 0 | 90 |
| 6 | 225 | 270 | 90 | 0 |
| 7 | 270 | 225 | 180 | 270 |
| 8 | 315 | 180 | 270 | 180 |

It will be appreciated by those skilled in the art that network circuit 200 is bilateral in operation between the network ports (sum RCP, sum LCP, difference RCP and difference LCP) and the eight signal ports. Thus, for example, when the sum RCP network port is driven by an rf signal, circuit 200 operates as a power divider and progressive phase shifter to provide the eight signal ports with equal power, progressively phase shifted signals. When the cavity is illuminated with RCP electromagnetic energy, the radiation elements are excited, and the respective signal contributions of the elements are progressively phase shifted and combined to form a signal at the sum RCP network port. Thus, the network circuit 200 is useful for both the receive and transmit modes.

With the network circuit as described in FIG. **3*b***, and further represented in Table I, the antenna system of the present invention provides an efficient dual circularly polarized antenna system with two dual channel monopulse capabilitites over a very wide bandwidth.

The gain of the antenna system of the preferred embodiment is about 7 to 10 decibels, depending on the frequency. In contrast, the gain of one spiral antenna for angle-of-arrival applications is understood to be in the range of 0 to 5 decibels, representing an improvement in gain of from 2 to about 6 decibels, depending on the frequency. The higher gain is due in part to the fact that the antenna of the preferred embodiment does not utilize any absorber loads, in contrast to the spiral antennas which typically utilize an absorber load at the outer ends of the spiral elements to absorb unradiated energy.

The efficiency of the antenna is further enhanced by the use of the cavity 120, which significantly reduces the energy spillover from the desired beam pattern to the region behind the antenna or to the side of the desired beam. Thus, a higher percentage of the radiated energy is in the principal beam pattern increases the antenna efficiency.

As indicated above, a primary application of the preferred embodiment is angle-of-arrival monopulse detection. As is well known, a monopulse tracker utilizes two displaced feed horns or radiation elements so that each receives the signal from a slightly different angle. The received signals are added to form a sum signal or pattern, or subtracted to form a difference signal or pattern. The sum signal may be used for gross pointing of the antenna. The difference signal will be at a null when the target is on boresight, and can be used as a servo input signal for steering the antenna toward the null position so that the target is on the boresight. However, for the angle-of-arrival detection application, the sum and difference signals are not used to move the antenna beam toward the null; rather, by processing the sum and difference signal amplitudes, the angular position of the target is derived.

Figure 4:
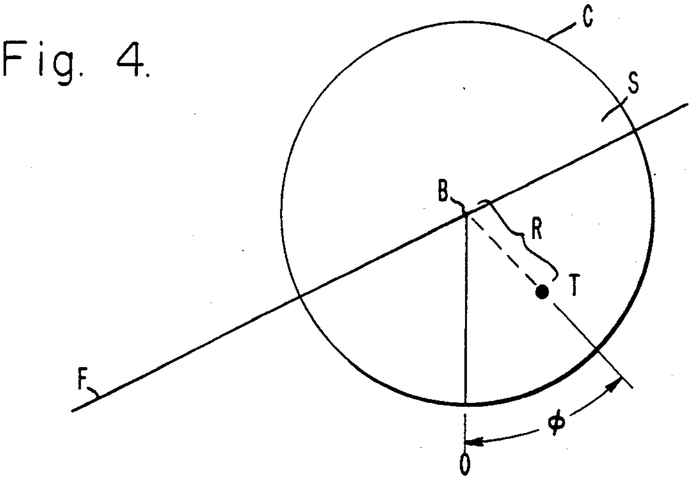
FIG. 4 is an illustration of the angles defining target position of an angle-of-arival monopulse detection system employing polar coordinates.

As shown in FIG. 4, the angle-of-arrival of the energy from target T in spherical surface S orthogonal to the antenna boresight line BF, may be defined by the planar angle $\phi$ which represents the angular position of the target T relative to a reference radial line BO in the orthogonal plane S. Distance R represents the radial distance from the target to the boresight BF.

It will be appreciated by those skilled in the art that, without regard to compensation by signal processing for variations in the antenna gain pattern, the resolution of the detection measurement will be limited by the degree of cross-sectional symmetry of the antenna sum and difference gain patterns. In FIG. 4, "C" represents a circle centered on the boresight and defining an area in surface S. If, for example, the gain of the antenna is substantially constant about the antenna boresight for all points on circle C, then the accuracy of the measurement of angles $\phi$ and $\theta$ for targets located on C will not be affected by the antenna characteristics. On the other hand, variations in the gain directly affect the measurement and, therefore, its accuracy. The ideal gain pattern is one circularly symmetrical in space about the boresight for all polarizations of radiation and frequencies. This symmetry will substantially simplify the radar signal processing.

Figure 5A:
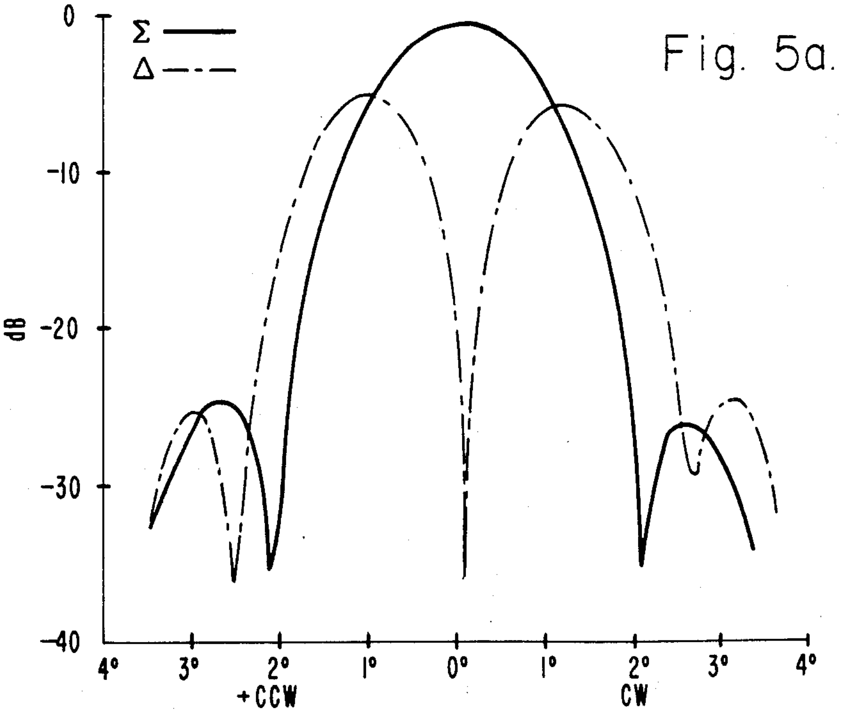
FIGS. 5*a* and 5*b* comprise azimuth and elevation cuts of the secondary patterns of the antenna system of the present invention installed as a feed system in a seven-foot paraboloidal reflector.
Figure 5B:
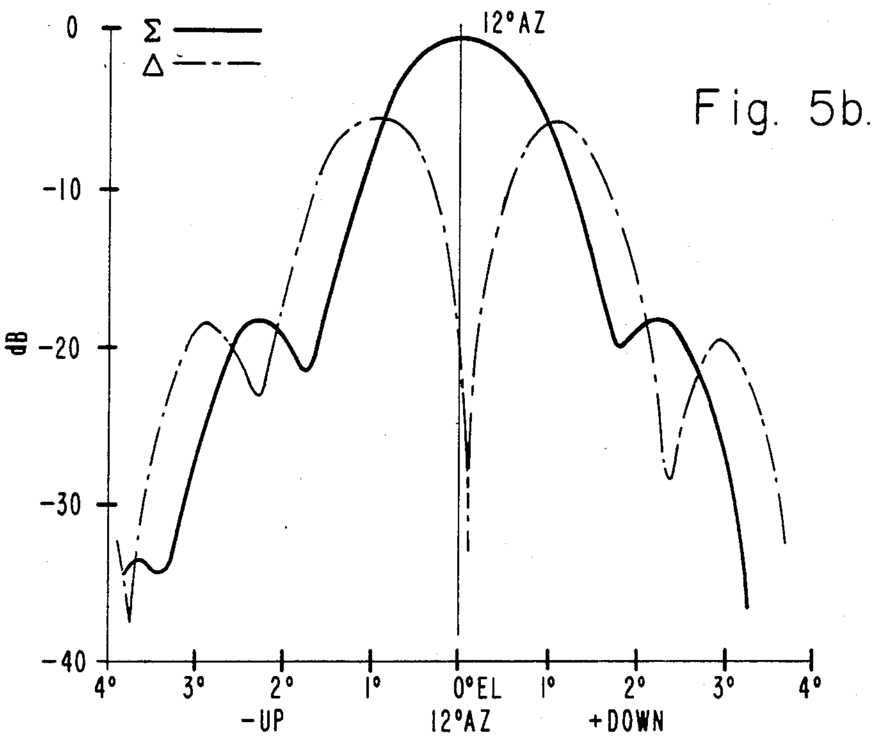

The preferred embodiment of the invention comprises an antenna system whose sum and difference gain patterns are substantially symmetrical in space about the antenna boresight. While the requisite degrees of symmetry will depend upon the application, acceptable results for many applications can readily be obtained in accordance with the preferred embodiment wherein both the sum and difference patterns of the antenna system are symmetrical to within 3 db of the peak value of the gain for a constant R value for all values of $\phi$ about the antenna boresight. In fact, difference patterns symmetrical to within 1 db of the peak value are readily achievable. To illustrate the symmetry of antenna systems employing the invention, measured secondary patterns for apparatus embodying the invention when utilized as an antenna feed system installed in a seven foot paraboloidal reflector are shown in FIGS. 5*a* and 5*b*. The patterns illustrated in FIG. 5*a* comprise an azimuth cut of the sum and difference patterns for a linearly polarized signal at 6.0 Ghz incident upon the antenna system. The patterns illustrated in FIG. 5*b* comprise an elevation cut for a linearly polarized signal at 6.0 Ghz incident upon the antenna system. As shown in these patterns, the difference pattern may be characterized as having a three dimensional "volcano" shape, i.e., having a sharp null at the center axis with sharply ascending and then descending sides.

The antenna system forces circularly symmetric radiation modes. The antenna difference pattern accomodates higher order modes, which equalizes the pattern in space about the boresight. The higher order modes result from the composite of what may be characterized as a dipole mode and a cavity mode. The dipole propagation mode is caused by direct excitation of the radiation elements. The radiation elements in turn parasitically excite the cavity to set up a cavity propagation mode, which equalizes the E and H plane energy, and lessens energy spillover outside the useful beam, for example, behind the antenna or at the beam sides. As a result of the composite higher order propagation mode, substantially circularly symmetric antenna difference patterns about the antenna boresight are achieved.

It is noted that circularly symmetric antenna sum patterns may be achieved with known antenna systems. For example, the nested cup dipole antenna feed structure described above provides a substantially symetrical sum pattern. An antenna structure comprising a pair of crossed-dipoles with a cavity will also provide a symmetrical sum pattern. These structures do not, however, provide a difference pattern which is substantially symmetrical in space about the antenna boresight.

In contrast to these known devices the present invention provides an antenna system which provides sum and difference patterns which are substantially symmetrical in space and with respect to all polarization angles. As a result, the direction finding capabilities of the system are substantially independent of the polarization of incident radiation.

Figure 6A:
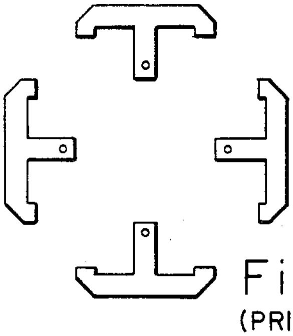
Fig. 6a. (PRIOR ART)
FIGS. 6*a*–6*c* are, respectively, simplified depictions of a prior art feed structure and its dipole configuration, a representation of areas of its direction finding capabilities and the predominant electromagnetic field modes of this prior art feed structure.
Figure 6B:
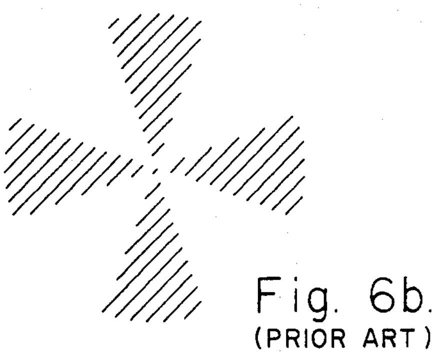
Fig. 6b. (PRIOR ART)
Figure 6C:
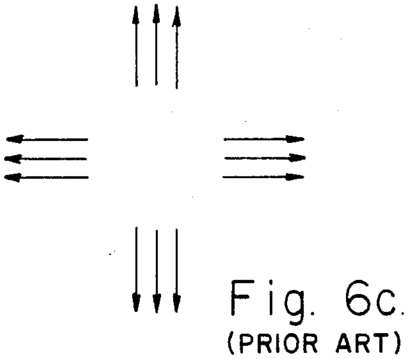
Fig. 6c. (PRIOR ART)

One prior art system, the nested cup dipole antenna system, utilizes four dipole elements arranged as shown in FIG. 6*a*, with the oppositely facing elements fed either in phase or 180° out-of-phase. The linearly polarized horizontal and vertical feed modes resulting from this arrangement are illustrated in FIG. 6*c*; the dominant mode is the $TE_{21}$ mode. This system has only a limited monopulse capability, since for pure vertically or horizontally polarized energy, the amplitude of the signal in one set of orthogonal dipoles is very low. Thus, this prior art system has good direction finding capabilities only for energy polarized at 45° relative to the dipole elements, and decreasing performance as the angle of polarization departs from 45°. This is illustrated in FIG. 6*b*, where the cross-hatched regions indicate those incident radiation polarization angles for which the direction finding capability of the system is relatively poor, and the open regions indicate those incident radiation polarization angles for which the direction finding capability of the system is relatively good.

Figure 6D:
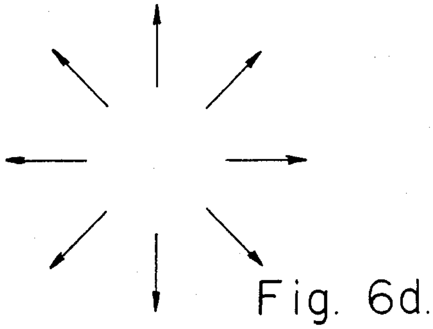
FIG. 6*d* is a simplified illustration of the circularly symmetric field modes generated by the preferred embodiment.

The polarization limitation in direction finding capability of this prior art system is overcome by the apparatus of the present invention, wherein circularly symmetric radiation modes are set up, as illustrated in FIG. 6*d*. With the arrangement of radiation elements of the preferred embodiment, there is no direction of polarization of incident radiation which is orthogonal to, and hence not recieved by, more than two elements.

Another advantage of the preferred embodiment is that energy of both right and left-hand circular polarization can be received (or transmitted). This is a substantial advantage over available systems, such as the spiral antenna. Moreover, only two receivers for each sense of polarization are required. The prior systems utilizing an X-Y coordinate system to define target position utilize receivers for each of the sum pattern, the azimuth difference pattern and horizontal difference pattern. The circularly symmetric modes generated by the preferred embodiment lead to circularly symmetrical or polar coordinate measurements, in turn reducing the number of receivers required for direction finding measurements. For one polarization sense, for example, RCP, only two receivers are required, for the sum RCP and difference RCP ports. Only four receivers are required for both RCP and LCP senses, thereby providing complete polarization redundancy with only four receiver channels.

Figure 7:
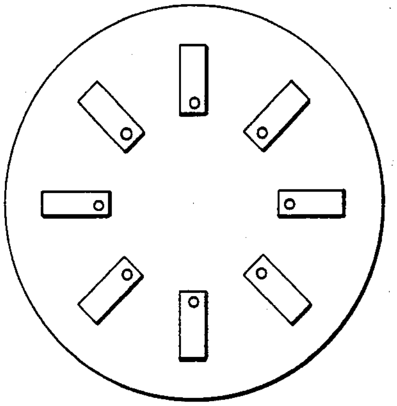
FIG. 7 is a simplified illustration of another embodiment of the invention.

It should be understood that the shaping of the radiation elements may be modified from that shown in FIG. 2. For example, an alternate embodiment of the shaping of the radiation elements on disc 150 is illustrated in FIG. 7. The elements in this alternate embodiment are rectangular elongated members disposed on equally spaced radial lines emanating from the disc center. The exact shape of the elements which is optimum for a particular application and range of frequencies is determined as part of the design engineering art.

It is not necessary that eight symmetrically spaced radiation elements be used. The generalized relationship between the number N of spaced elements and their relative phasing $P_s$ and $P_d$, where $P_s$ is the phase separation between adjacent elements for the sum signal and $P_d$ is the phase separation for the difference signal, is shown in Equations 1A and 1B:

$$P_s = \frac{360^\circ}{N} \qquad \text{Equation 1A}$$

$$P_d = \frac{720^\circ}{N}. \qquad \text{Equation 1B}$$

It is desired for accurate angle-of-arrival detection that sufficient elements be used to obtain substantially symmetric beam patterns; for example, if only four elements were used, it is believed that a scalloped difference pattern would result. Such a pattern would significantly detract from the angular resolution of the system (without regard to correction by signal processing). Six elements would provide sufficient symmetry for some applications, with $P_s=60°$ and $P_d=120°$. However, the network circuit would require the use of nonstandard devices for phase shifting the signal by 60° and 120°.

The antenna system of the present invention is also readily adapted to concentric nested configurations for multiband applications. An example of the nested configuration is illustrated in simplified schematic form in FIGS. 8*a* and 8*b*. This alternate embodiment comprises three concentrically nested rings of radiation elements and cylindrical enclosures. For clarity, the radiation elements are illustrated in FIG. 8*a* simply as radial extending linear elements. It is contemplated, however, that closely packed radiation elements of a similar configuration to those illustrated in FIG. 2 will be employed in the nested configuration, with further shaping to ensure separation of elements in adjacent rings of elements. Alternatively, a rotational displacement of adjacent rings (e.g. 22 ½°) may be advantageous.

Figure 8B:
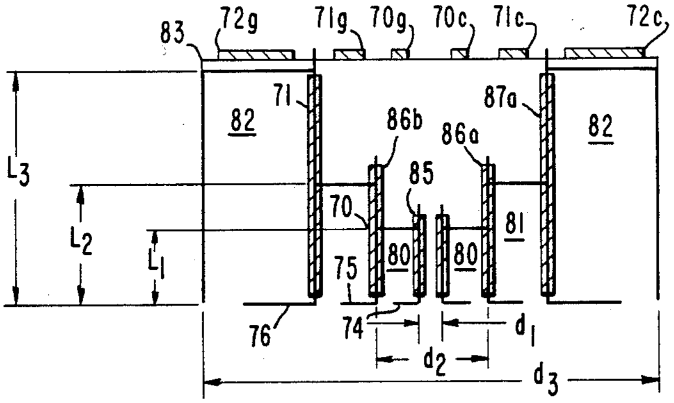
FIG. 8*b* is a simplified cross-sectional view of the alternate embodiment of FIG. 8*a*, taken along line 8*b*—8*b*.
Figure 8A:
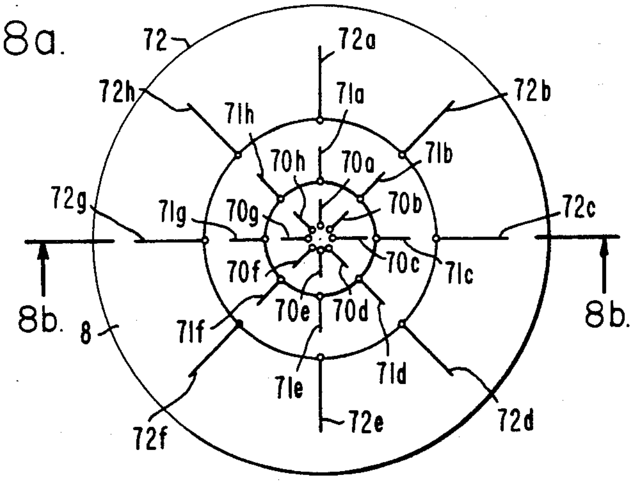
FIG. 8*a* is a simplified plan view of another embodiment of the invention.

Referring now to FIGS. 8*a* and 8*b*, concentric conductive cylindrical enclosures 70, 71 and 72, together with conductive plates 74, 75 and 76 define three cavities 80, 81 and 82. Plate 74 comprises a substantially circular plate member conductively joined to one end of cylindrical enclosure 70. Plates 75 and 76 comprise annular plate members, respectively conductively joined to one end of enclosures 71 and 72. Thus, cavity 80 is defined by enclosure 70 and plate 74, cavity 81 is defined by enclosures 70 and 71 plate 75, and cavity 82 is defined by enclosures 71 and 72 and plate 76.

This embodiment is designed for multiband operation in first, second and third frequency bands having center frequencies $f_1$, $f_2$, and $f_3$, where $f_2=2f_1$, and $f_3=2f_2$. Dimensionally, the diameter $d_1$ of cavity 80 is approximately 75% of the wavelength at the lower band-edge frequency $f_{L1}$ of the first frequency band, the diameter $d_2$ of cavity 81 is approximately 75% of the wavelength at the lower band-edge frequency $f_{L2}$ of the second frequency band, and the diameter $d_3$ of cavity 82 is approximately 75% of the wavelength at the lower band-edge frequency $f_{L3}$ of the third frequency band. The length 11 of cavity 80 is about 25% of the wavelength at frequency $f_1$, the length 12 of cavity 81 is about 25% of the wavelength at frequency $f_2$ and the length 13 of cavity 82 is about 25% of the wavelength of frequency $f_3$. The cavity dimensions are approximate and would be optimized for each particular application. The diameter of the cavity should be greater than 50% of the wavelength at the lower band-edge frequency, and for particular applications might be only 60% to 70% of that wavelength.

Circular dielectric disc 83 is secured adjacent the outer rims 70*a*, 71*a* and 72*a* of cylinder 70, 71 and 72. In a manner similar to that described above in connection with the preferred embodiment, eight conductive radiation elements 70*a*–70*h* are disposed on dielectric disc 83 to form an inner set of equally spaced radiation elements above inner cavity 80. Eight radiation elements 71*a*–71*h* are disposed on dielectric disc 83 to form an intermediate set of equally spaced radiation elements above annular cavity 81. Eight radiation elements 72*a*–72*h* are disposed on dielectric disc 83 to form an outer set of equally spaced radiation elements above outer annular cavity 82. The relative sizes of the radiation elements follow the same ratios as for the cavity sizes, 1:2:4, for the inner, intermediate and outer sets of elements, respectively.

As with the preferred embodiment, the inner set of radiation elements is fed by eight coaxial tranmission lines 85*a*–85*h* disposed through openings adjacent the center of plate 74. The outer conductors of cables 85*a*–85*h* are grounded to plate 74 and to each other, and the inner conductors are electrically connected to respective ones of elements 70*a*–70*h*.

Cables 86*a*–86*h* are brought through openings in plate 74 adjacent enclosure 70, along the inner surface of cylinder 70 to disc 83, and the outer conductor of each cable is grounded to the rim of cylinder 70 adjacent the respective radiation element of the intermediate set to which the center conductor of the cable is connected. Similarly, cables 87*a*–86*h* are brought through openings in plate 75, along the inner surface of cylinder 71 to disc 83, with the outer conductors grounded to the rim of cylinder 71 adjacent the respective radiation element of the outer set to which the inner conductor is connected.

The concentrically nested antenna system illustrated in FIGS. 8*a* and 8*b* provides the capability of two dual channel monopulse operation in three octave frequency bands centered respectively at frequencies $f_1$, $f_2$ and $f_3$. The antenna system is expected to have relatively high efficiency in each frequency band, and it is anticipated that the sum and difference patterns in each band are substantially symmetrical about the boresight.

While the preferred embodiments of the invention have been described in context of antenna systems, it is contemplated that apparatus employing the present invention could also be utilized as high frequency antenna feed systems for reflectors or lenses, feeding, for example, paraboloidial reflectors.

In all cases, it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the present invention.

What is claimed is:

1. An antenna system comprising:

a substantially cylindrical cavity defined by a conductive enclosure and having a center axis;

N radiation elements comprising substantially identical, substantially planar, non-interleaved elements of a polygon shape arranged in a closely packed, substantially symmetrical configuration about the axis of said cavity and adapted for communicating right circularly polarized (RCP) and left circularly polarized (LCP) electromagnetic energy wherein N is no less than six; and difference signal means coupled thereto for providing an antenna system difference pattern characterized by substantial symmetry in space about the antenna boresight.

2. The antenna system of claim 1 wherein said difference signal means is adapted to provide one difference (RCP) signal for RCP radiation and another difference LCP signal for LCP radiation.

3. The antenna system of claim 2 wherein said difference signal means comprises network circuit means coupled to said radiation elements, said circuit means arranged to couple signals between said elements and a difference RCP network port and a difference LCP network port.

4. The antenna system of claim 3 wherein said network circuit means is further adapted to progressively phase shift signals associated with each element by 720°/N with respect to the signal associated with adjacent elements.

5. The antenna system of claim 1 wherein said cavity has a depth of approximately 25% of the wavelength at the mid-band frequency of the antenna system frequency band.

6. The antenna system of claim 1 wherein said cavity has a diameter greater than 50% of the wavelength of the lower band-edge frequency of the antenna system frequency band.

7. The antenna system of claim 6 wherein said cavity diameter is approximately 75% of said wavelength.

8. The antenna system of claim 3 wherein said network circuit means includes N coaxial transmission lines fed through openings in said enclosure, each having an inner conductor coupled to one of said radiation elements.

9. The antenna system of claim 1 wherein the number N of radiation elements is sufficient to force substantially circularly symmetric propagation modes of electromagnetic energy.

10. The antenna system of claim 1 wherein the number N of radiation elements is eight.

11. The antenna system of claim 10 wherein said radiation elements comprise four pairs of opposed elements.

12. The antenna system of claim 9 wherein said network circuit means includes first, second, third and fourth 180° hybrid networks, each having sum and difference ports and two side arm ports, and wherein the side arm ports of each hybrid network are coupled one each to one element of an element pair.

13. The antenna system of claim 1 further comprising sum signal means for providing antenna system sum signals characterized by substantial symmetry about the antenna boresight.

14. In a cylindrical cavity-backed antenna system having N radiation elements disposed adjacent the top surface of the cavity and spaced about a center axis of the cavity, and a feed system coupled to such elements, the improvement comprising:

N is at least six;

the radiation elements comprise substantially identical, substantially planar, non-interleaved elements of a polygon shape arranged in a closely packed, substantially symmetrical configuration about the axis of said cavity; and network circuit means coupled to the feed means for producing an antenna system sum signal and an antenna system difference signal.

15. The improvement of claim 14 wherein said network circuit means coupled to said feed system has N signal ports for coupling one to each radiation element, said network circuit means including first and second phase shifting circuits, said first phase shifting circuit arranged to introduce progressive phase shifts of 360°/N to signals associated with said respective elements to produce said sum signal, and said second phase shifting circuit arranged to introduce progressive phase shifts of 720°/N to the signals associated with said respective elements to produce said difference signal.

16. The improvement of claim 15 wherein said number of elements N is eight, and wherein said first phase shifting network is adapted to introduce 45° phase shifts, and said second phase shifting circuit is adapted to introduce 90° phase shifts.

17. The improvement of claim 16 wherein said antenna system is adapted to communicate electromagnetic radiation of the right circular polarization (RCP) sense and left circular polarization (LCP) sense.

18. The improvement of claim 17 wherein said first phase shift circuit further comprises a first LCP port and a first RCP port, and said second phase shift circuit comprises a second LCP port and a second RCP port.

19. The improvement of claim 18 wherein said antenna system is utilized in an angle of arrival detection system comprising radar receiver means and radar resolver means.

20. The improvement of claim 19 wherein said receiver means comprises a four channel means and wherein said first and second LCP and RCP ports are respectively coupled to one of the channels of said receiver means.

21. An antenna system comprising:

first and second coaxially disposed conductive cylinders of a first diameter and a second diameter, each having first end regions, the first end regions of said cylinders being in substantial transverse alignment;

a first transverse conductive member disposed across and conductively joined across said first cylinder so as to define a first cavity inside said first conductive cylinder;

an annular second transverse conductive member disposed laterally between and conductively joined to said first and second conductive cylinders so as to define a second cavity in the annular region between said first and second cylinders;

a first set of N conductive radiation elements extending outwardly in a general radial direction from the center axis of said first cavity toward the adjacent first cylinder and generally equally spaced from adjacent elements, said radiation elements being insulated from said cylinders and being substantially parallel to the plane formed by said first end region of said first conductive cylinder, wherein N is at least six;

a second set of P conductive radiation elements extending outwardly in a general radial direction from adjacent the first cylinder toward the second cylinder, said radiation elements being insulated from said cylinders and being substantially parallel to the plane formed by said first end region of said second cylinder, wherein P is at least six;

difference signal means coupled to said first set of radiation elements and arranged to produce one difference signal characterized by a difference signal pattern which is substantially symmetrical in space about the angenna boresight; and second difference signal means coupled to said second set of radiation elements and arranged to produce a second difference signal characterized by a difference signal pattern which is substantially symmetrical in space about the antenna boresight.

22. The antenna system of claim 21 wherein said first cylinder has a first diameter of at least 50% of a first wavelength of the lower band-edge frequency of a first antenna frequency band, and said second cylinder has a second diameter of at least 50% of a second wavelength of the lower band-edge frequency of a second antenna frequency band.

23. The antenna system of claim 22 wherein said first cavity has a depth approximately equal to 25% of the wavelength at the mid-band frequency of said first frequency band, and said second cavity has a depth of approximately 25% of the wavelength of the mid-band frequency of said second frequency band.

24. The antenna system of claim 23 wherein said first and second sets of radiation elements are disposed on a dielectric disc member disposed adjacent said first ends of said first and second cylinders.

25. The antenna system of claim 21 wherein said difference signal means and said sets of radiation elements are arranged to force circularly symmetric propagation modes of electromagnetic energy.

26. An antenna system comprising:

a plurality of coaxially disposed conductive cylinders of progressively larger diameters, each having first and second end regions, the first end regions of said cylinders being in substantial transverse alignment.

a plurality of transverse conductive members disposed across and conductively joined to said cylinders defining a cylindrical inner cavity and annular outer cavities.

a plurality of sets of conductive radiation elements disposed generally on concentric rings, the first set equally spaced about the center axis of the cylinders and extending generally radially outward above said inner cavity, and the succeeding rings respectively equally spaced and extending generally radially outwardly above the successive annular cavities each set having at least six radiation elements; and a plurality of difference signal means coupled respectively to each set of radiation elements and arranged to produce a plurality of difference signals each characterized by a difference signal pattern having substantial symmetry about the antenna system boresight.

27. The improvement of claim 14 wherein rhe radiation elements comprise substantially identical, substantially planar elements of a polygon shape arranged in a closely packed, substantially symmetrical configuration about the axis of said cavity.

28. The improvement of claim 21 wherein the radiation elements comprise substantially identical, substantially planar elements of a polygon shape arranged in a closely packed, substantially symmetrical configuration about the axis of said cavity.

* * * * *